Aug. 6, 1968  J. D. KIESLING  3,396,394
DIRECTIVE ANTENNAS
Filed Sept. 15, 1965  5 Sheets-Sheet 1
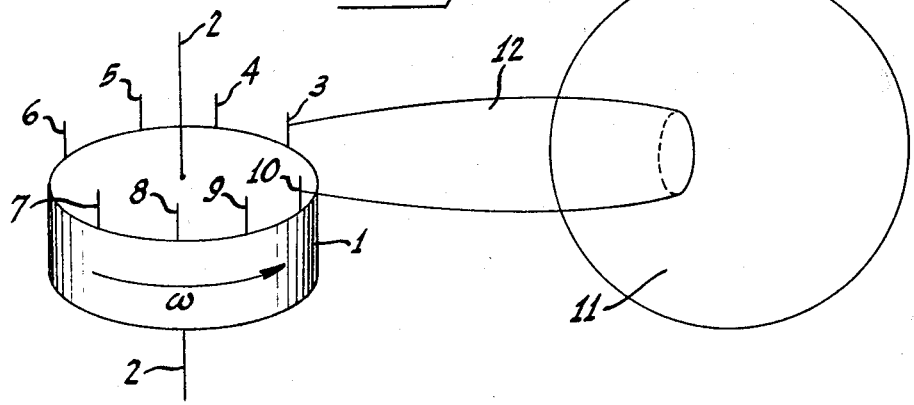
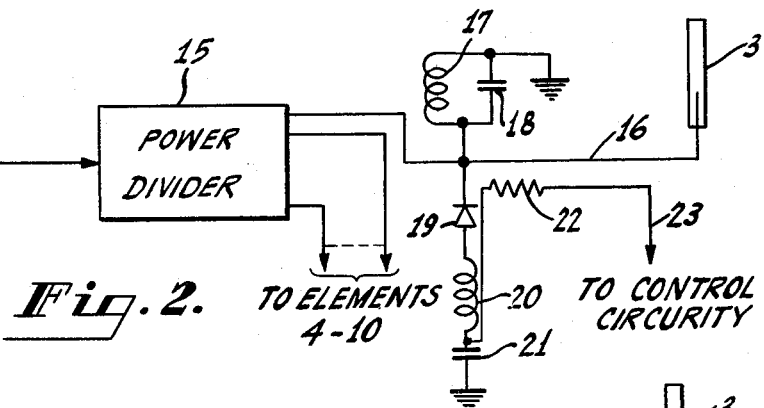
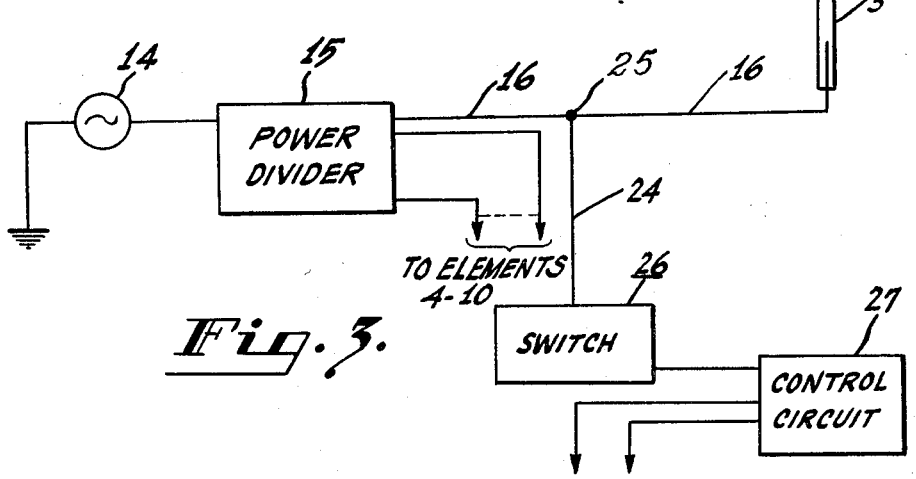
INVENTOR.
JOHN D. KIESLING
BY
Edward J. Norton
Attorney Aug. 6, 1968   J. D. KIESLING   3,396,394
DIRECTIVE ANTENNAS Filed Sept. 15, 1965   5 Sheets-Sheet 2

INVENTOR.
JOHN D. KIESLING
BY
Edward J. Norton
Attorney

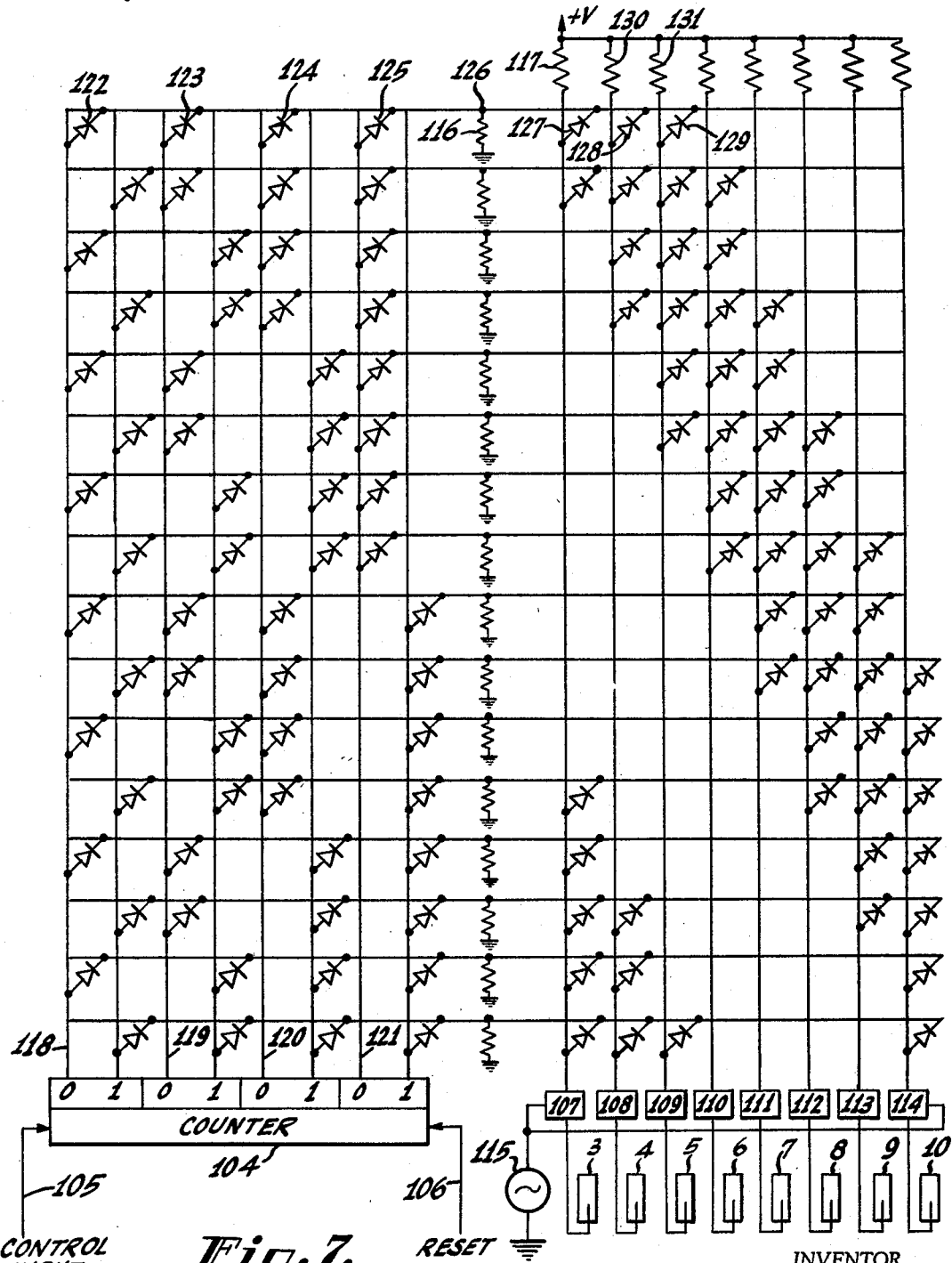

Aug. 6, 1968    J. D. KIESLING    3,396,394
DIRECTIVE ANTENNAS
Filed Sept. 15, 1965    5 Sheets-Sheet 5
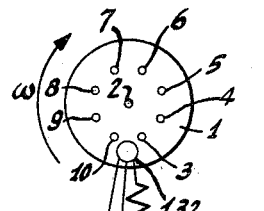
$Fig. 8.$
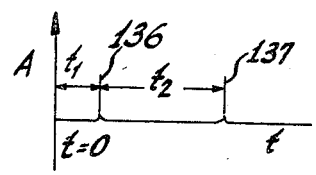
$Fig. 9.$
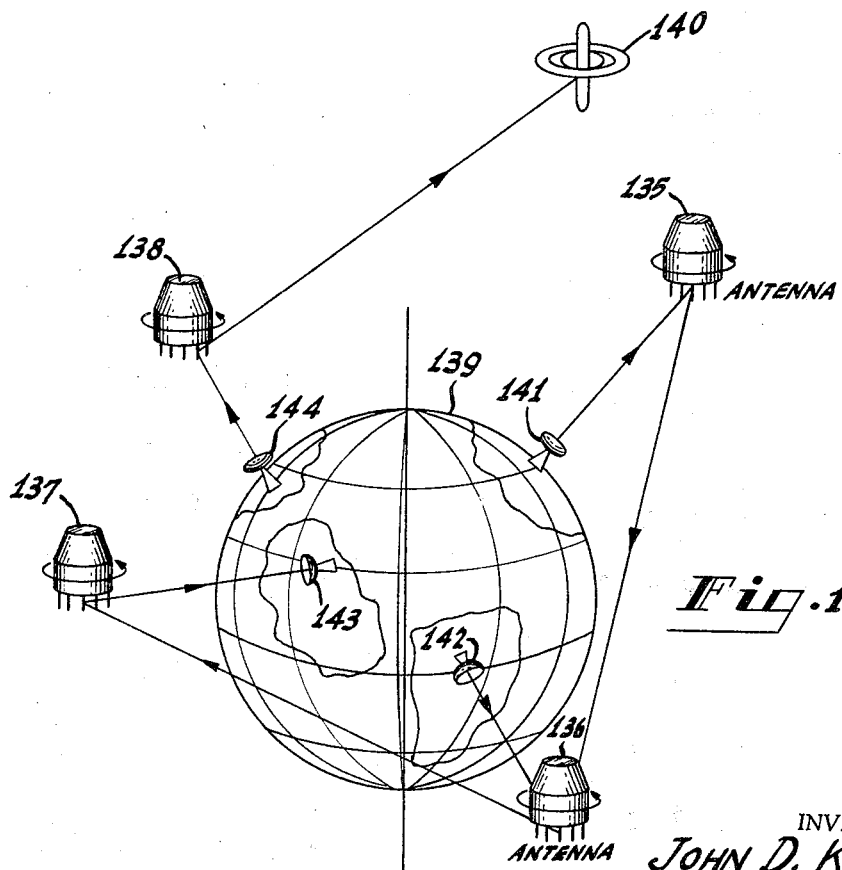
$Fig. 10.$
INVENTOR.
JOHN D. KIESLING
BY Edward J Norton
Attorney United States Patent Office 3,396,394
Patented Aug. 6, 1968

3,396,394
DIRECTIVE ANTENNAS
John D. Kiesling, East Brunswick, N.J., assignor to Radio Corporation of America, a corporation of Delaware
Filed Sept. 15, 1965, Ser. No. 487,485
6 Claims. (Cl. 343—100)

ABSTRACT OF THE DISCLOSURE

A body adapted to spin about an axis is provided with an array of antennas, the antennas being of the type whereby a pencil beam radiation pattern is emitted perpendicular to the antenna elements. The antenna elements are switched on and off by control circuitry such that, for example, two or more of the elements are always on. The antenna elements, that are on at any time, are by the control circuitry provided selected as those elements directed, for example, towards an earth station. The rate of switching these elements is controlled so that they are switched counter to the spin velocity of the body in order to maintain the radiation pattern towards a desired location irrespective to the spin.

---

This invention relates to directive radio antennas and more particularly to apparatus for providing dimensional control of a conical radiation beam using on-off control.

In a spacecraft, such as a satellite, radio antennas capable of transmitting information to an earth station and receiving information from the earth station are required. In order to obtain efficient reception and transmission from such a vehicle, it is desirable that, when possible, the antennas be directed towards the earth stations at all times.

Various methods have been proposed to accomplish this. One such method uses an antenna array mounted on a movable member. The member and array are are mounted on the satellite, and are physically moved to keep the antenna array directed towards the earth. In another system, the antenna array is stationary and the attitude of the satellite is varied, thus keeping the array directed towards the earth. The combination of a physically moveable array and attitude changing means is also employed. The above two methods and the combination pose difficulties in that large and complex electromechanical control systems are necessary.

To eliminate complex systems as above, it has been proposed to orbit the satellite in such a manner that it is caused to spin about an axis as it orbits the earth. Such an axis is prependicular to a line from earth to the satellite. One may then use a directive antenna which produces a uniform circular field pattern, narrow in width, about a plane extending through the center of the satellite, and on a perpendicular in reference to the spin axis. Consequently some portion of the antenna pattern is always directed towards the earth. Although this arrangement serves to eliminate bulky electromechanical equipment, it is inefficient as all of the radiated energy is not directed towards earth. Hence to obtain a more efficient operation, it would be desirable to use a pencil beam pattern pointed at earth at all times. To accomplish this, the antenna pattern must rotate counter to the spin of the satellite at the same angular velocity. Equipment for rotating beams has been described in the prior art in connection with directive radio finders, radio beacons, and so on. This art is not concerned with weight problems, and such systems are too complex and bulky to be used with satellites.

Electronic phaseshifting of a pencil beam pattern has been suggested whereby the input power is phase shifted on an array of antenna elements. The excitation phase if varied by electronically controlled phase shifters causing the beam to rotate counter to the spin of the body and at the same angular velocity. This system employs relatively complex and heavy electronic equipment to control the phase shift and, as a result, is not satisfactory where size, weight and complexity are important factors.

Accordingly it is an object of the present invention to provide an improved arrangement for achieving antenna directivity from a radio system on a spinning body.

Another object is to provide improved apparatus for increasing antenna power gain from a spinning satellite.

Another object is to provide an improved apparatus for controlling antenna directivity from radio equipment on a spinning body, the apparatus being both light in weight and simple in design.

Another object is to provide simplified circuitry to control a directive beam causing it to rotate counter to the spin of a satellite and at an identical angular velocity.

In accordance with these and other objects of the invention, a body, for example, a satellite, adapted to spin about an axis is provided with an array of antennas, the antennas being of the type whereby a pencil beam radiation pattern is emitted perpendicular to the antenna elements. The antenna elements are switched on and off by control circuitry such that two or more of the elements are always on. The antenna elements that are on at any particular time are by the control circuitry provided selected as those elements providing radiation patterns directed towards the earth station. The control circuitry further performs the function of sequentially turning the elements on and off in a manner such that the beam radiation pattern is caused to rotate counter to the spin of the satellite and in synchronism with its angular velocity.

The novel features of this invention, both as to its organization and method of operation, as well as additional objects and advantages thereof, will be understood more readily from the following description when read in conjunction with the accompanying drawings in which:

FIGURE 1 is a schematic showing a spinning body with a circular array of eight discrete antenna elements two of which are radiating and pointing towards a target.

FIGURE 2 is a circuit diagram and FIGURE 3 is a block diagram of one embodiment of a switch and power divider which can be employed in accordance with this invention.

FIGURE 7 is a circuit diagram of a further embodiment of a control system as shown in FIG. 5.

FIGURE 8 illustrates a synchronization scheme which can be used in accordance with this invention.

FIGURE 9 is a graph of amplitude vs. time showing angular velocity information of a satellite.

FIGURE 10 is a perspective view of a multiplicity of satellites and control stations operating in accordance with this invention.

Figure 4:
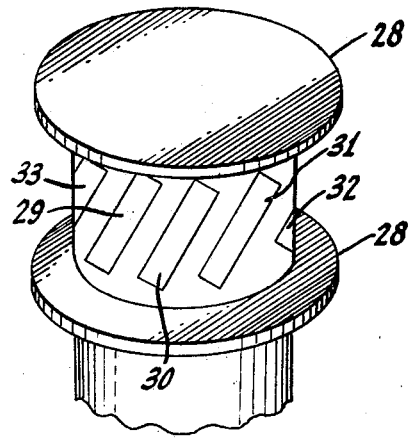
FIGURE 4 is a side view of one type of antenna which can be used in accordance with this invention.

If reference is made to FIGURE 1, there is shown a body 1 which is made to spin about its axis 2 at an angular velocity ω. A plurality of antenna elements are symmetrically disposed about the spin axis 2. In this case a total of eight are shown and referenced as 3 to 10. Two elements 3 and 10 are assumed to be emitting radiation in a pencil beam or conical type field pattern designated as 12. The beam 12 is in a plane perpendicular to the spin axis 2 of the body 1. Antennas for generating such patterns are well known in the art and in themselves form no part of the present invention. It is to be understood that a suitable reflector or other means, not shown, is provided with the elements 3 through 10 to provide the directivity of the radiation pattern. The beam of radiation 12 from antenna elements 3 and 10 falls upon a desired area of a target 11. The target 11 may be the earth, another planet or another body to which it is desired to transmit a radio signal confined in a certain discrete area. Assuming that the beam 12 remains in the same position relative to the antenna elements 3 and 10, it can be seen that as the body 1 rotates with an angular velocity ω, there will be a point where the beam 12 generated by elements 3 and 10 is swept off the target 11. Hence in order to confine the beam to the discrete area on target 11, the radiation pattern will have to move in a direction opposite to the rotational direction of the body 1 and at a velocity equal to ω.

As the body 1 spins in the direction of the arrow, antenna element 9 moves closer to the desired position in relation to the target 11 while antenna element 3 moves further away. In accordance with the present invention, antenna element 9 is turned on at the proper time and antenna element 3 is turned off, thereby always concentrating the radiation on the desired area of target 11. The body 1 can be a satellite placed in an orbit about the earth or target 11. The satellite when placed in orbit is given a spin so that it spins in orbit with the angular velocity ω. The techniques involved in orbiting satellites and causing them to spin about an axis are known in the art and in themselves are not part of the present invention.

Referring to FIGURE 2, it will be noted that in order to accomplish the switching between antenna elements, each antenna element 3 through 10 is connected to a power source 14 through a power divider 15, which may consist of isolation circuits in the nature of emitter followers or may be an ordinary resistor divider or reactance divider network. The main purpose of the power divider 15 is to connect the individual antenna elements 3 through 10 to a common power source 14. The power divider 15 has an output lead for each of the antenna elements 3 through 10. A lead 16 is shown which is the output lead for antenna element 3. Lead 16 connects power divider 15 to the center conductor of antenna element 3. A parallel turned circuit comprising an inductor 17 and a capacitor 18 is connected between lead 16 and a point of reference potential such as ground. A series circuit consisting of a diode 19, which may be a PIN semiconductor crystal diode, an inductor 20 and a capacitor 21 is also connected between lead 16 and the point of reference potential. A lead 23 serves to connect control circuitry, not shown in FIG. 2, through a resistor 22 to the junction of inductor 20 and capacitor 21.

The arrangement of FIG. 2 operates as follows. When a negative control voltage is impressed on lead 23, the diode 19 becomes reversed biased, and the parallel circuit consisting of inductor 17 and capacitor 18 resonates with the residual impedance of the diode 19 to form an open circuit, allowing power to flow into the antenna element 3. When the control voltage lead 23 switches from a negative to a positive voltage, the diode 19 becomes forward biased and the residual reactance of the diode 19 resonates with the series circuit consisting of inductor 20 and capacitor 21 to form a low impedance which reflects power back to the power divider 15 thus removing power from the antenna element 3. The power divider 15 has a separate output for each of the antenna elements 3 through 10. The respective outputs of the power divider 15 are individually connected via a circuit similar to that shown in FIG. 2 to the antenna elements, enabling the antenna elements 3 through 10 to be turned on and off by suitable control circuitry.

FIGURE 3 is included to show that, while a particular switching technique has been described in connection with FIG. 2, any suitable technique may be used. Like elements in FIGS. 2 and 3 are designated by the same numerals. If reference is made to FIGURE 3, a source of power 14 is connected via a power divider 15 to a plurality of antenna elements, in this case eight. The connection from the power divider 15 to each antenna element includes a separate switch 26. The switch 26 for antenna element 3 and connected to lead 16 is shown in FIG. 3. The switch 26 may be a ferrite switch, a varactor or a transistor. If the switch 26 is a varactor, the lead 24 can be a transmission line. The line 24 has a certain length L, and the varactor switch is constrained to have two values of capacity $C_1$ and $C_2$, depending on the magnitude of the control voltage impressed on it via the control circuit 27. The value $C_1$ in conjunction with the line length L forms a short circuit across the line 16 at the junction point 28, thereby preventing power from flowing into the antenna element 3. When the control circuit 27 causes the potential on the varactor to change and the capacity of the varactor to change to $C_2$, the length of the line 24 together with $C_2$ forms an open circuit at junction point 25 and power flows to the antenna element 3. As indicated in FIG. 3, there is an output from the control circuit 27 for each of the switches 26 in the circuits of the respective radiating elements 3 through 10.

The number of antenna elements while shown as eight could be any number and is only limited by practical considerations, as the larger the number of antenna elements the smaller will be the positioning steps.

FIGURE 4 shows by way of example an antenna which can be used to produce the desired field pattern 12 of FIG. 1. Four inclined radiating slots 29, 30, 31 and 32 are shown equally spaced about a cylinder 33. Each of the slots 29 through 32 can be driven by a separate coaxial line as indicated in FIGS. 1 through 3. For eight slots about the cylinder 33, only four of which are actually shown in the view of FIG. 4, the optimum spacing is nearly π/2. The slots 29 through 32 will radiate outwardly and hence this is a substitution for the antenna elements shown in FIG. 1. The circular plates 28 are polarizing plates and serve to convert linear polarization to circular polarization in order to obtain the required field pattern. Other antenna elements such as turnstile, helices, and horns can also be used so long as the radiation pattern is conical of the pencil beam type.

Figure 5:
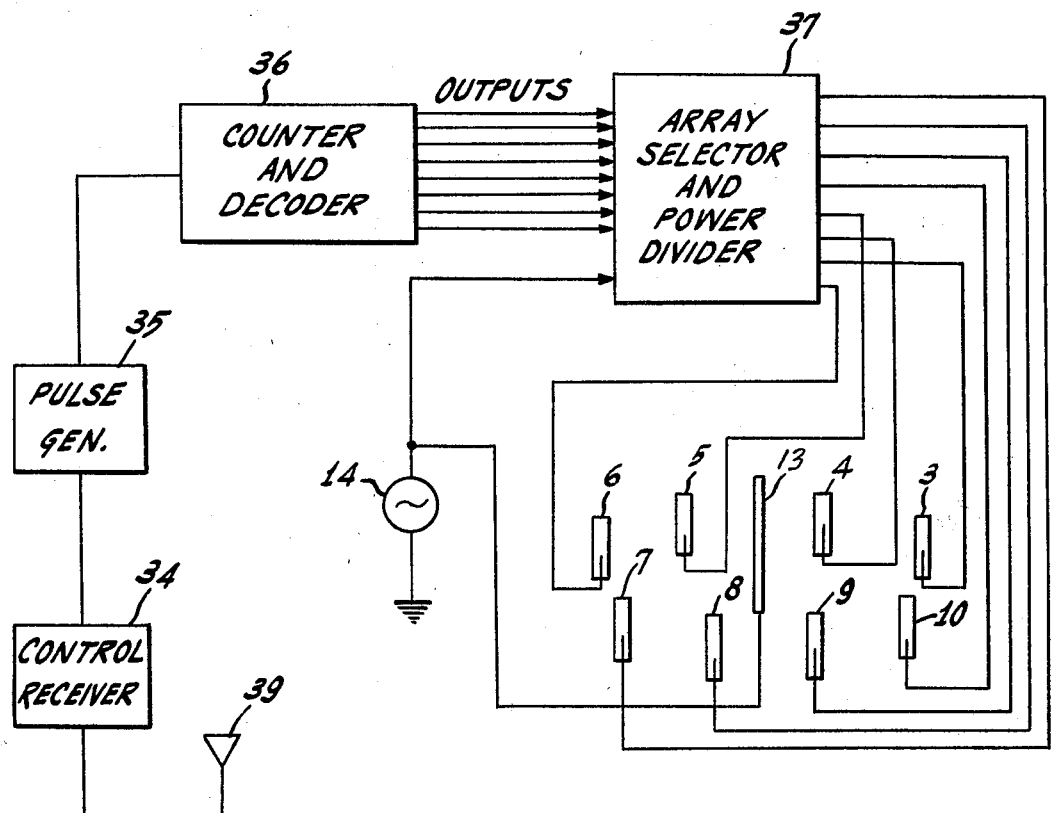
FIGURE 5 is a block diagram of a control system operating in accordance with this invention.

FIGURE 5 is a block diagram of one embodiment of a control system for the antenna elements according to the invention. Assuming that a satellite is employed, an antenna 39 is mounted on the satellite and is used to receive synchronizing signals from a ground station on earth. While a separate antenna 39 is shown for this purpose, the antenna elements 3 through 10 may be used in place of the separate antenna. This can be accomplished by time sharing of the antenna elements 3 through 10 by the transmitter and receiver. Any suitable technique for using antennas for receiving and transmitting simultaneously could be used.

The signal energy received by antenna 39 is coupled to a receiver 34, which acts as a conventional receiver and has an output which is the demodulated signal impressed on the carrier frequency used. This signal from the control receiver 34 is coupled to a pulse generator 35 which serves to amplify and shape the control signals. The pulse generator 35, may be an amplifier followed by a Schmitt trigger or a one-shot. The output of the pulse generator 35 is fed into a counter and decoder 36. The counter and decoder 36 can be a binary counter and output gates used to decode the possible states of the counter. The counter and decoder 36 can consist of conventional transistor logic circuitry, magnetic logic circuitry, or diode logic circuitry. The counter and decoder 36 has a plurality of outputs representing the desired number of discrete switching states to be used. The outputs are fed to an array selector and power divider 37, whose function is to couple energy from the transmitter source 14 to the selected antenna elements 3 through 10. It can be seen that as the synchronizing signals are received by the antenna 39, the counter and divider 36 in conjunction with the array and power divider 37 will cause different combinations of antenna elements 3 through 10 to be connected to the transmitter power source 14. FIGURE 5 also shows an antenna element 13 locted in the center of the array. This center element 13 serves to radiate the transmitted signal at all times to further strengthen the signal and enhance the field pattern or the center element 13 can be switched on or off in conjunction with the other elements 3 through 10.

It has been discovered that the preformed operation of the system requires certain switching sequences. The switching sequence determines the number of antenna elements that will be radiating at any one instance. It can be shown that by causing two or more antenna elements to radiate at once and by switching in one or more at a later instant, the result is to keep the VSWR, voltage standing wave ratio, relatively constant, as the impedance variation is less than would be obtainable by switching in one and then another. Further, it is desirable to switch in an antenna element or a group of elements while two or more are radiating. This will cause power to always radiate and thereby offer no interruption in transmission, while keeping the VSWR losses to a minimum.

Figure 6:
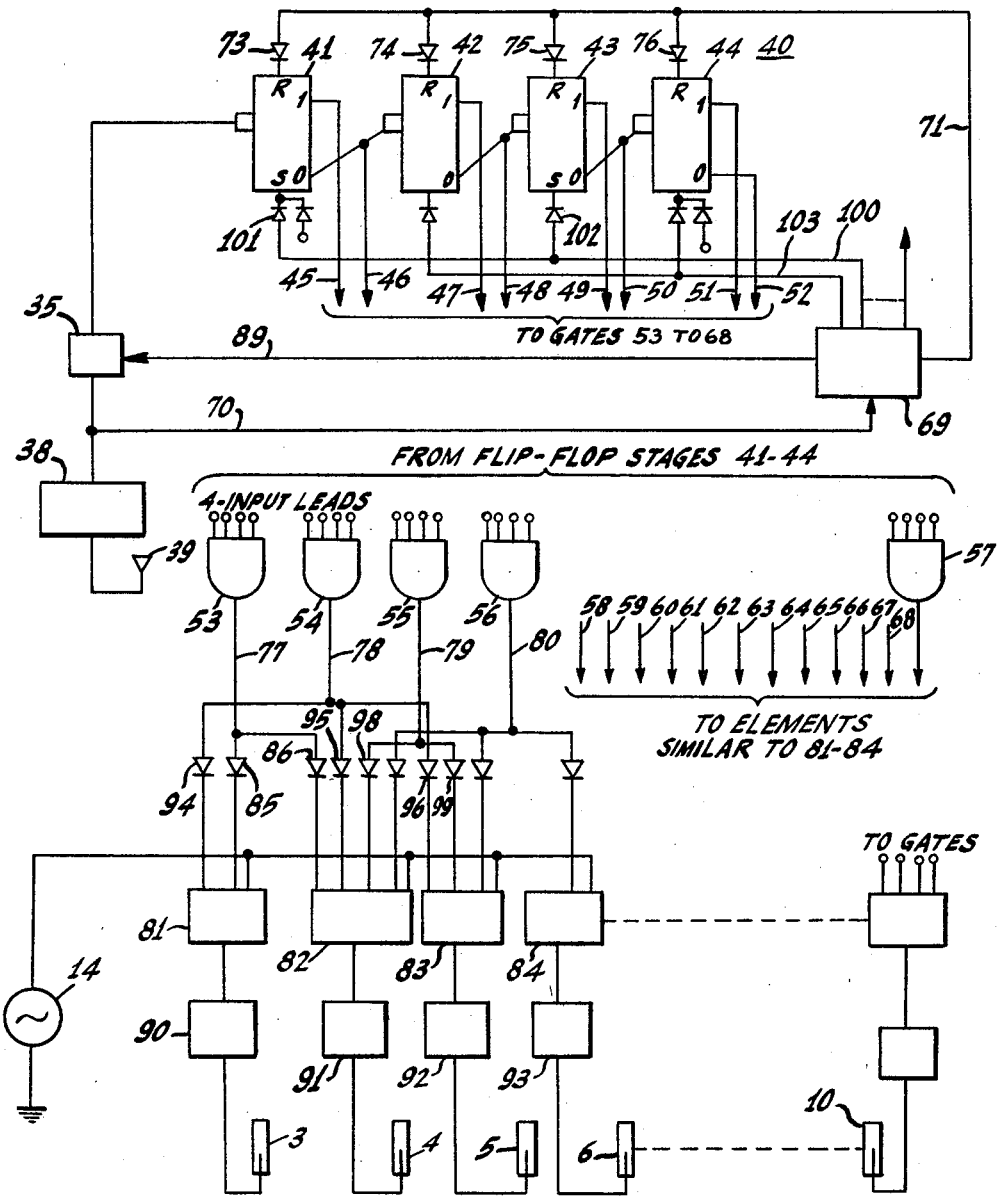
FIGURE 6 is a block diagram of one embodiment of a control system as shown in FIG. 5.

FIG. 6 is a block diagram showing in further system detail one embodiment of a control system as described in connection with FIG. 5. A switching sequence will be described in connection with FIG. 6, whereby a certain sequence of antennas are caused to radiate under control of a synchronizing signal which may be sent from the ground or another satellite. The sequence to be described will cause the antenna elements to radiate in sequence according to Table 1. The table gives the binary status of a counter 40 included in the counter and decoder 36 of FIG. 5, showing the array of antenna elements that are caused to be selected.

*Table 1*

| Binary status of counter 40: | Antenna elements that are radiating |
| --- | --- |
| 0000 | 3, 4 |
| 0001 | 3, 4, 5 |
| 0010 | 4, 5 |
| 0011 | 4, 5, 6 |
| 0100 | 5, 6 |
| 0101 | 5, 6, 7 |
| 0110 | 6, 7 |
| 0111 | 6, 7, 8 |
| 1000 | 7, 8 |
| 1001 | 7, 8, 9 |
| 1010 | 8, 9 |
| 1011 | 8, 9, 10 |
| 1100 | 9, 10 |
| 1101 | 9, 10, 3 |
| 1110 | 10, 3 |
| 1111 | 10, 3, 4 |
| 0000 | 3, 4 |
| Etc. | Etc. |

As one sees from Table 1 there are sixteen unique combinations of antenna elements that are desired to radiate in sequence. The four stage binary counter 40 comprises flip-flops 41 through 44. The flip-flops are wired as a conventional binary counter known in the art. They are shown in block form, as the stages 41 through 44 could consist of any type of logic capable of performing the counting sequence. Other forms of counters could be used, as well, in place of 40, these counters may be ring, decimal, or so on. Each stage 41 through 44 has two stable states, indicated by convention as binary "1" and binary "0." The truth table for the counter 40 is given by the right hand portion of Table 1, and has sixteen unique states. In order to decode the sixteen states the "1" and "0" side of each flip-flop stage 41 through 44 is brought out via leads 45 through 52 respectively. These output leads go to sixteen "and" gates 53 through 68 corresponding to the sixteen states of the counter 40. For a clearer presentation only five such gates are actually shown and are designated 53 through 57. The "and" gates decode the various output states of counter 40. Hence gate 53 decodes the "0000" state, gate 54 the "0001" state and so on, up to the last or sixteenth gate 57 which decodes "1111" or binary fifteen. The additional eleven gates 58 through 68 are indicated merely by the bracket and the arrowed leads 58 through 68 between gate 56 and 57. The operation of the circuit in performing the first four sequences indicated in Table 1 will be given, the process being similar for the remainder of the table.

When the attitude of the satellite is determined, as discussed in connection with FIG. 1, the ground station transmits a signal to the satellite which is received by antenna 39. This signal is demodulated by the receiver 38 and is sent to the counter control 69 via lead 70. The received signal may be a tone on the carrier of one frequency which corresponds to a reset tone for the counter 40 to place it in the reset condition. The counter control 69 detects this signal and resets the counter by placing an appropriate potential on lead 71. Lead 71 goes to the reset sides of the flip-flop stages 41 through 44 via diodes 73 through 76, respectively. This reset causes the counter 40 to be set to the "0000" state which is assumed to be the initial state. The four inputs of the "and" gate 53 and wired to the "0" sides of flip-flops 41 through 44 via leads 46, 48, 50 and 52. Hence And gate 53 decodes "0000," and the output 77 of this gate is "high." The output 77 is coupled to elements 81 and 82 through diodes 85 and 86 respectively. The elements 81 and 82 are included in and form a part of the power divider 37 described in connection with FIG. 5. In this case they can be considered as analog "or" gates. Namely elements 81 and 82 each have an input from the transmitter power source 14. When the output of gate 53 is high, elements 81 and 82 couple power into the antenna elements 3 and 4. The switching function provided by a PIN diode, varactor or other controllable device, as discussed in connection with FIGS. 2 and 3, is contained within element 81 and 82 or may be separately contained as in elements 90 through 93. In this case the power dividers 81 through 84 supply the transmitter power source signal impressed upon a D.C. level. This D.C. will properly bias the switches 90 through 93 to allow the energy from the power source 14 to go to the antenna elements as previously explained. The switching function as mentioned before could be incorporated within the power dividers 81 through 84 and elements 90 through 93 may be omitted or serve as impedance matching devices. It can now be seen that for the "0000" state of counter 40, antenna elements 3 and 4 are radiating power.

Since the body upon which the array of antenna elements 3 through 10 is mounted is continuously rotating, the radiation pattern will have to rotate counter to this rotation to prevent the beam from sweeping off the target. At the proper instant another synchronizing signal is transmitted and received by antenna 39. This signal couples via the shaping or pulse generator circuit 35 to the input of the first stage 41 of counter 40. This causes the counter to switch from binary state "0000" to binary state "0001." Gate 53 turns off and gate 54 which is wired to decode "0001" turns on. The output 78 of gate 54 is high. It should be noted at this point that as far as the radiation from anntennas 3 and 4 is concerned, the turning off of gate 53 and the turning on of gate 54 occurs so rapidly that antennas 3 and 4 remain radiating with little or no significant interruption because of the inherent dalay in the devices. When the output 78 of gate 54 goes high, this couples to elements 81, 82 and 83 via diodes 94 through 96 respectively. This allows the power source signal to be supplied to antennas 3, 4 and 5 in the same manner as previously described. Now another antenna element, namely element 5, is radiating energy and hence the rotation of the satellite is compensated by the power and directivity of the additional transmitting antenna element 5. Upon receipt of the next synchronizing signal, the counter 40 advances to its next binary position, namely "0010." Gate 55 is wired to decode this. The output 79 of gate 55 goes high. This output is coupled to elements 82 and 83 through diodes 98 and 99 respectively. The high output of gate 55 at lead 79 now causes antenna elements 4, 5 to radiate turning element 3 off, as there is no longer need for element 3 because the body has rotated enough to move antenna element 3's radiation pattern away from the target. Thus far the sequence for the antenna elements has been 3–4, 3–4–5, 4–5. It has been also shown that radiation existed throughout the switching sequence because of the speed of switching apparatus. It can now be seen that the reception of a further synchronizing pulse causes the counter 40 to advance to its next position or state which is "0011." And" gate 56 is wired to decode this state. The output 80 of gate 56 goes high and causes antenna elements 4, 5, and 6 to radiate as herein before described. The first four steps of Table 1 have been implemented. The complete implementation of the remaining steps of the Table 1 follows from the operation already described, and will be accomplished by the remaining twelve gates 57 through 68 when properly wired. It will also be noted that there are sixteen synchronizing pulses for a complete rotation of the body, after which the sequence is repeated, thereby maintaining a radiation pattern focused on a point at all times.

The counter control circuit 69 can also perform other functions besides resetting the counter 40. Namely in some applications it may be desired not to start from the "0000" state but from another state. The ground station will then transmit a unique signal which is picked up by the receiver 38 and sent to the counter control circuit 69 via lead 70. The detection circuits in the counter control circuit 69 will cause the counter 40 to be set to another initial condition. For instance if lead 100 is energized by the counter control circuit 69, it will cause the counter to be set to "0101" state. This is accomplished by diodes 101 and 102 which go to the set side of flip-flop stages 41 and 43. The counter 40 may be reset to "0000" first by the received signal and immediately cause to move to "0101" by the next signal. From Table 1 it can be seen that antenna elements 5, 6 and 7 radiate for the decoding of "0101." Lead 103 shows another condition whereby the counter 40 will be caused to provide "1010" as its output. This will, in turn, cause antenna elements 8 and 9 radiate. It can also be seen that upon the application of a proper signal to counter control circuit 69 via the antenna 39 and receiver 38, an inhibit condition can be placed on the shaping circuit 35 via a lead 89 which prevents the shaping circuit 35 from supplying pulses to the counter 40, thereby causing certain antenna elements determined by the state of the counter 40 to remain radiating.

If reference is made to FIGURE 7, there is shown another embodiment of a control system according to the invention. The sequence for this configuration is different from that previously described. This matrix will cause the sequence as shown in Table 2 to be implemented.

Table 2

| Binary Status of counter 104: | Antenna elements that are radiating |
| --- | --- |
| 0000 | 3, 4, 5 |
| 0001 | 3, 4, 5, 6 |
| 0010 | 4, 5, 6 |
| 0011 | 4, 5, 6, 7 |
| 0100 | 5, 6, 7 |
| 0101 | 5, 6, 7, 8 |
| 0110 | 6, 7, 8 |
| 0111 | 6, 7, 8, 9 |
| 1000 | 7, 8, 9 |
| 1001 | 7, 8, 9, 10 |
| 1010 | 8, 9, 10 |
| 1011 | 3, 8, 9, 10 |
| 1100 | 3, 9, 10 |
| 1101 | 3, 4, 9, 10 |
| 1110 | 3, 4, 10 |
| 1111 | 3, 4, 5, 10 |

The configuration shown in FIGURE 7 is based on known diode matrix logic. It consists of a counter 104, which operates identically to the counter 40 previously described. The counter control circuit, pulse shaping circuit and other circuitry providing inputs to the counter 104 via leads 105, 106 can be similar to those described in connection with FIG. 6 and have not been repeated in FIG. 7. The counter 104 is shown in block form and, like the previously described counter 40, can consist of four stages to give sixteen unique outputs. Each stage's outputs are represented by a "1" and a "0" terminal shown at the top of the counter. Each output terminal, the "1" and "0," is brought out and wired to selected terminals of a plurality of diodes arranged in a matrix to decode the sixteen states of the counter 104. Hence there are eight horizontal lines connected to the counter 104's outputs.

In order to decode the sixteen possible states the matrix consists of sixteen vertical lines. The operation of the diode matrix in decoding the "0000" state of the counter 104 will be described. When counter 104 is in the "0000" state, the leads 118, 119, 120 and 121, representing the "0" sides of the four flip-flop stages in the counter 104, are all assumed to be at a negative potential with respect to ground. Hence diodes 122 through 125 are reversed biased and represent a high impedance compared to resistor 116. The potential at junction 126 is substantially at ground. This ground potential appears on the cathode terminals of diodes 127, 128 and 129. The anode terminals of these diodes are returned to a positive source through resistors 117, 130 and 131, respectively. Hence, diodes 127, 128 and 129 conduct, and the voltage at the anode terminals of diodes 127 through 129 is negative-going. The magnitude is determined by the value of resistor 116 and resistors 117, 130, and 131. The voltage applied to switches 107, 108 and 109, goes from +V volts to a lower voltage. This change in voltage causes the switches 107, 108, 109 of the type shown in FIG. 2, for example, to conduct and transfer signal from the power source 115 to the antenna elements 3, 4 and 5 as previously described.

When the counter 104 is switched to the next state of Table 2, which is "0001," the anode terminal of diode 122 goes positive with respect to ground. Diode 122 conducts and the voltage at terminal 126 becomes more positive than the +V volts supplied to diodes 127, 128 and 129 through resistor 117, 130 and 131. Therefore the cathodes of diodes 127, 128, 129 are more positive than the anodes, and the diodes 127, 128 and 129 are reversed biased. It can also be seen that the four diodes in the horizontal directly below diodes 122 through 125 are now cut-off effecting a switch in of elements 107, 108, 109, and 110, and antenna elements 3, 4, 5, 6 are now radiating. This completes the first two steps of Table 2. The remaining switching elements 110 through 114 are controlled in an identical manner as can be seen from FIGURE 7 and cause the sequence indicated by Table 2 to be implemented.

It should of course be understood that different potentials or diode polarity than those described above can be applied to the diode matrix to obtain various control voltages for the switching elements 107 through 114. It can also be seen that the control logic shown in FIGURE 6 and the control and matrix logic shown in FIGURE 7 can be integrated circuits, affording very small and light packaging which is ideal for satellite applications as weight is an important factor. As can be seen from FIG. 7, the failure of a diode in the matrix controlling the switching elements 107 through 114 would only cause a single antenna element to stop radiating during one sequence, as diodes normally fail open-circuited. The counter 104 is controlled in the identical manner as the counter 40 previously described in FIG. 6. The reset lead 106 performs the same function as previously described, namely resetting the counter 104 to the "0000" state.

If reference is made to FIGS. 8 and 9, a technique which can be employed to determine the angular velocity $\omega$ of a satellite 1 will be described.

Reference numeral 1 indicates generally a satellite spinning in orbit with an angular velocity $\omega$. The satellite 1 has a plurality of antenna elements 3 through 10, which are disposed about the spin axis 2. The antenna elements 3 through 10 are controlled by switching techniques as previously described. As above, some arrangement is required to synchronize the switching between these elements. An antenna 132 is located on the periphery of the satellite body 1 and emits a pencil-like beam of radiation 135. The antenna element 132 is not switched. Hence each time the satellite 1 rotates with respect to a ground station 133, the beam 135 sweeps off ground station 133's receiving antenna. If this information were processed and displayed on a scope, one would obtain a display as shown in FIG. 9. The time $t2$ between pulses 136 and 137 is directly proportional to the angular velocity of the satellite. The time $t1$ which is the time before the first pulse is picked up by the ground station gives the rotational attitude of the satellite. Antenna element 132 is shown placed between antenna elements 3 and 10. Hence when the pulses 136 and 137 appear on the display this represents the position of antenna element 132 with respect to the receiving antenna of the ground station 133 and therefore the positions of antenna elements 3 through 10 are also known. Using pulses 136 and 137 as the time references, a set of pulses can now be generated and sent to the satellite 1 by a transmitter 134. The modulated waveform shown as sent from the transmitter 134 to antenna 132 or a further antenna corresponding to the antenna 39 shown in FIGS. 5 and 6 represents sychronization pulses to control the antenna element switching. Alternatively, antenna element 132 can be located on the side of the satellite opposite that upon which the antenna elements 3 through 10 are mounted. The antenna element 132 can also be used to receive signal information from the ground station 134 and thus serves a dual purpose.

FIGURE 10 shows further applications made easier to perform by using the invention described herein. Orbiting the earth 139 in a synchronous manner are satellites 135 through 138, which are caused to spin about their axes as previously described. In many instances, high frequency communication becomes difficult from one point to another on the earth 139, because of atmospheric disturbances or because line-of-sight communication may be desired. Let us assume it is desired to communicate from a point on earth 139, represented by station 141 to a point on the opposite side of earth represented by station 143. Station 141 causes satellite 135 to direct its transmission by control of its antenna elements towards satellite 136. The information passed between satellite 135 and satellite 136 contains information causing satellite 136 to direct its transmission by control of its antenna elements to satellite 137. Satellite 137 receives information causing the antenna elements thereon to transmit to ground station 143.

Information can now be conveyed from station 141 to station 143. If the propagation is adversely affected, the path can be switched by directing satellite 135 to control its antenna elements to transmit the signal information to satellite 138. Each ground station 141 through 144 can initiate a message or communication and control the group of satellites 135 through 138 in a manner to keep their respective antennas transmitting in the desired direction. The system control for such a world-wide communication network is simple if the switching technique as described herein is used, since the structure needed as described above to implement the system is itself simple and readily implemented.

A deep space probe or station 140 is also shown in FIG. 10 which can also be interrogated at will, via a ground station, by the ground station 144 causing a satellite 138 to direct its transmission through control of the antenna elements on the satellite 138 in the direction of the space probe 140. Other applications of the switching technique and synchronization method described herein are possible and follow from the description given.

I claim:

1. A satellite of the type which spins about an axis and is intended to communicate with a ground station comprising:
    a plurality of antenna elements located symmetrically about said axis,
    switching means,
    circuit means coupled to said elements through said switching means,
    and means arranged to be controlled from said ground station for operating said switching means to cause at any particular time at least two of said elements having radiation patterns directed at said ground station to be driven from said circuit means.

2. In a combination as claimed in claim 1, said controlled means consisting of a binary counter, and a plurality of logic gates.

3. In a combination as claimed in claim 1, said switching means including PIN diodes the conduction of which is controlled by said controlled means.

4. In combination:
    a satellite orbiting the earth and spinning about an axis with an angular velocity,
    a plurality of antenna elements arranged symmetrically about an axis of said satellite,
    a plurality of switching devices each of which is individually coupled to an antenna element,
    a control circuit with a plurality of outputs each of which is individually coupled to one of said switching devices,
    transmitting means coupled to said switching devices,
    a radio receiver coupled to control circuit and adapted to receive radio synchronizing signals from a point remote to said satellite,
    said control circuit operating in response to said received synchronizing signals to determine the position of said satellite relative to said remote point and operating said switching devices in accordance with said determination to cause at any particular time at least two of said antenna elements to be driven from said transmitting means with said elements being driven in a sequence to direct said transmitted signal in a desired direction from said satellite.

5. In combination:
    a satellite in a synchronous orbit about a planet with said satellite being adapted to spin about its axis at an angular velocity,
    a plurality of antenna elements arranged in a symmetrical fashion about said axis of said satellite, the field radiation pattern of each element being of the pencil beam type and radiating energy transverse to said element,
    a radio transmitter associated with said satellite and producing a radio signal, a plurality of switching devices coupled between said transmitter and said antenna elements, control means coupled to switching devices, a radio receiver associated with said satellite and coupled to said control means, another antenna element mounted on said satellite and caused to radiate a pencil beam pattern, a station remote from said satellite adapted to receive said other antenna's radiated power and transmit to said receiver in said satellite information as to said angular velocity of said satellite, said control means being responsive to the receipt by said receiver of said information to operate said switching devices to cause a combination of said antenna elements to be driven from said transmitter to radiate in a desired direction.

6. A satellite of the type which spins about an axis and is intended to communicate with a remote station, comprising:

(a) a plurality of antenna elements located symmetrically about said axis, (b) switching means, (c) circuit means coupled to said elements through said switching means, and (d) means to determine said satellite's position in relation to said remote station for operating said switching means to cause at any particular time at least two of said elements having radiations patterns directed at said remote station to be driven from said circuit means.

References Cited

UNITED STATES PATENTS

| | | | |
|---|---|---|---|
| 3,044,063 | 7/1962 | Russell | 343—100 |
| 3,133,282 | 5/1964 | Rosen | 343—100 |
| 3,157,878 | 11/1964 | Hansel et al. | 343—100 X |

RODNEY D. BENNETT, *Primary Examiner.*

B. L. RIBANDO, *Assistant Examiner.*